United States Patent [19]

Tanaka et al.

[11] Patent Number: 5,003,176

[45] Date of Patent: Mar. 26, 1991

[54] IONIZATION CHAMBER

[75] Inventors: Eiichi Tanaka; Tatsuro Hayashi, both of Shizuoka, Japan

[73] Assignee: Hamamatsu Photonics K.K., Shizuoka, Japan

[21] Appl. No.: 509,739

[22] Filed: Apr. 17, 1990

[30] Foreign Application Priority Data

May 1, 1989 [JP] Japan .................................. 1-112592

[51] Int. Cl.[5] .......................... G01T 1/85; H01J 47/02; H01J 47/06; H01J 47/08

[52] U.S. Cl. .................................... 250/374; 250/376; 250/378; 250/386; 250/387

[58] Field of Search ............... 250/374, 376, 377, 378, 250/386, 387

*Primary Examiner*—Carolyn E. Fields
*Assistant Examiner*—James E. Beyer
*Attorney, Agent, or Firm*—Finnegan, Henderson, Farabow, Garrett and Dunner

[57] ABSTRACT

An ionization chamber can stably measure a weak ionizing radiation with high sensitivity. The ionization chamber comprises an electrically conductive charge collecting electrode having a magnetic substance or a permanent magnet; an electromagnet for positioning the charge collecting electrode in non-contact with the other part of the ionization chamber; a position sensor for detecting the position of the charge collecting electrode; a circuit for feedback-controlling the magnetic force of the electromagnet to maintain the charge collecting electrode at the substantially same position; and ionization current detecting circuit for detecting an ionization current collected at the charge collecting electrode by ionization due to radiation applied to the ionization chamber.

9 Claims, 4 Drawing Sheets

IONIZATION CHAMBER

FIELD OF THE INVENTION

This invention relates to ionization chambers, and more particularly to an ionization chamber which is suitable for monitoring environmental gamma rays or monitoring concentration of radon in the air or monitoring of radioactive contamination of the air with high stability and with high sensitivity.

BACKGROUND OF THE INVENTION

As shown in FIG. 8, a conventional ionization chamber 10 used for measurement of ionizing radiation has a charge collecting electrode 12 supported by an insulator 14, so that current (ionization current) collected at the charge collecting electrode 12 is measured. In FIG. 8, reference numeral 16 designates a high voltage source to form an electric field between the inner wall of the ionization chamber 10 and the charge collecting electrode 12.

The ionization current can be measured by various methods. In one example of the methods, as shown in FIG. 8, a micro-current meter 20 is connected directly to the charge collecting electrode 12. In another example, as shown in FIG. 9, a high resistor 22 is connected to the charge collecting electrode 12, and a voltage (potential difference) developed across the resistor 22 is measured with an electrometer (voltmeter) 24. In another example, as shown in FIG. 10, a capacitor 26 is connected to the charge collecting electrode 12, and, after the capacitor is reset by a reset switch 28, the variation of the voltage developed across the capacitor 26 is measured.

The above-described ionization chamber is extensively employed for measurement of external radiations, because it is stably sensitive to radiations, excellent in energy characteristic concerning X-rays and gamma rays, and low in manufacturing cost.

In addition, the ionization chamber may be used for measurement of the contamination of the air by radioactive materials or the concentration of radon by introducing the external air directly into the chamber. The ionization chamber un-sealed for the above purpose is called "ventilation type ionization chamber", hereafter.

As was described above, in the conventional ionization chamber, the charge collecting electrode 12 is supported with the ionization chamber by the insulator 14. Hence, the detection of weak radiations is limited by electrical noises such as the electrical leakage through the insulator 14 or its surface and piezo-electricity generated by the mechanical distortion of the insulator 14.

Therefore, in measurement of relatively weak radiations such as environmental radiations, it is often necessary to increase the sensitivity of the ionization chamber to decrease the influence of the insulator. Therefore, the volume of the ionization chamber is usually increased and/or the internal pressure of the ionization chamber is increased to several normal atmospheres. In addition, the electrical leakage of the insulator's surface is affected by humidity. Accordingly, it is necessary to maintain the humidity inside the ionization chamber low at all times. Especially for a ventilation type ionization chamber to measure the contamination of air by radioactive materials or the concentration of radon in the air, it is necessary to maintain the humidity inside the ionization chamber at low by using a desiccating agent.

In the ordinary natural circumference, the radiation level due to cosmic rays and natural radioactive materials is about 5 to 15 μR/h. In the case of an air-tight ionization chamber, which is formed by using a material such as plastics whose atomic number is closed to that of air, and has a volume of one liter and one atmosphere inside it, the radiation of 10 μR/h produces an ionization current of about $10^{-15}$ A.

In general, in the ordinary circumference, the concentration of radon in the air depends greatly on geographical conditions, housing conditions, ventilating conditions, weather conditions, etc. The average concentration of radon in a housing in Japan is estimated to be about 0.3 to 0.5 pCi/l. A caluculation shows that when one litter of air containing radon of 0.5 pCi/l is introduced into an ionization chamber, the expected ionization current will be about $10^{-15}$ A.

However, in general, the ionization current which can be measured stably for a long period of time with the conventional ionization chamber using the insulator is about $10^{-15}$ A or higher, and therefore it has been rather difficult to measure an ionization current of the order of $10^{-15}$ A.

SUMMARY OF THE INVENTION

An object of this invention is to eliminate the above-described difficulties accompanying a conventional ionization chamber. More specifically, an object of the invention is to provide an ionization chamber which is completely free from the influence of the insulator and can stably perform measurements with high sensitivity.

The foregoing object of the invention has been achieved by an ionization chamber which, according to the invention, comprises: an electrically conductive charge collecting electrode including a magnetic substance or a permanent magnet; an electromagnet for holding the charge collecting electrode inside the ionization chamber in such a manner that the charge collecting electrode is not in contact with the other part of the ionization chamber; a position sensor for detecting the position of the charge collecting electrode; a circuit for feedback-controlling the magnetic force of the electromagnet so that the charge collecting electrode is held substantially at the same position; and ionization current detecting means for detecting an ionization current collected at the charge collecting electrode by ionization due to radiations incident to the ionization chamber.

Further, in the ionization chamber, the ionization current detecting means is a non-contact type electrometer.

Furthermore in the ionization chamber, the ionization current detecting means comprises: a reset contact which is brought into contact with the charge collecting electrode every predetermined period of time; and means for detecting an amount of charge flowing through the reset contact at the time of resetting the charge collecting electrode.

Furthermore, in the ionization chamber, the ionization current detecting means comprises: an electrically conductive blade connected to the charge collecting electrode; electrode plate across which predetermined voltage is applied; and means for detecting the displacement of the blade which is caused by electrostatic forces provided between the blade and the electrode plate.

Furthermore, in the ionization chamber, the ionization current detecting means comprises: an electrically conductive blade connected to the charge collecting electrodes; variable magnetic field forming means for externally providing a variable magnetic field to turn the charge collecting electrode; a detecting electrode confronted with the blade; and means for detecting the charge which is provided at the detecting electrode through electrostatic induction.

According to the present invention, the charge collecting electrode is suspended in the ionization chamber by magnetic force in such a manner that it is not in contact with the other part of the ionization chamber. Therefore, the above-described electrical noises attributing to the electrode supporting insulator can be eliminated, and accordingly the minimum detectable amount of radiations is greatly decreased. As a result, the ionization chamber of the present invention can be used as an environmental radiation detector small in size, low in manufacturing cost and high in sensitivity. Furthermore, by introducing the external air into the ionization chamber, an extremely small amount of radioactive contamination in air can be detected, and the concentration of radon and its daughter nuclides in the air can be detected with high sensitivity independently of the humidity of air.

DESCRIPTION OF THE PREFERRED EMBODIMENTS

Preferred embodiments of the present invention will be described with reference to the accompanying drawings :in detail.

Figure 1:
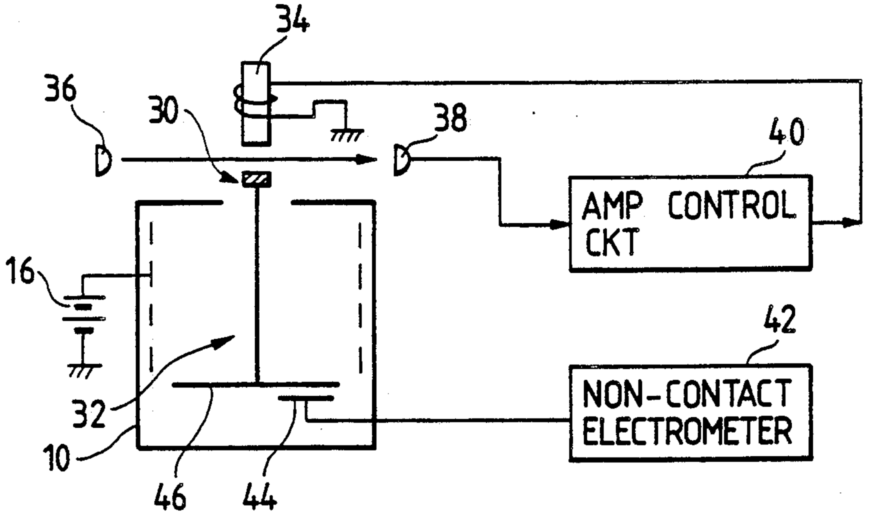
FIG. 1 is a block diagram, partly as a sectional diagram, showing the arrangement of an ionization chamber, a first embodiment of this invention.

A first embodiment of the invention, as shown in FIG. 1, comprises: an electrically conductive charge collecting electrode 32 having a magnetic substance 30 (such as a soft iron piece) as its part (the upper end in this embodiment); an electromagnet 34 for suspending the charge collecting electrode 32 by its magnetic force in an ionization chamber 10 such a manner that the electrode 32 is not in contact with the other part of the ionization chamber; a position sensor, having a light source 36 and a photo-sensor 38, for detecting the vertical position of the charge collecting electrode 32; an amplifier control circuit 40 for performing feedback control of the coil current of the electromagnet 34 according to the output of the photo-sensor 38, to maintain the vertical position of the charge collecting electrode substantially unchanged; and a non-contact electrometer 42 for detecting an ionization current which is collected at the charge collecting electrode 32 by the ionization due to radiations incident to the ionization chamber.

The non-contact electrometer 42 has a detecting electrode 44, which is confronted with an electrically conductive blade 46 connected to the lower end of the charge collecting electrode 32, so as to detect the potential variation which is caused by the ionization current induced in the charge collecting electrode 32.

For example, an infrared LED is used as the light source 36 to emit a pulsed light beam. The light beam thus emitted is received by the photo-sensor 38 which is made up of a photodiode for instance.

The amplifier control circuit 40 includes a CR integrating circuit and differentiating circuit having suitable time constants, to stably suspend the charge collecting electrode 32.

The operation of the first embodiment thus constructed will be described.

The charge collecting electrode 32 is suspended inside the ionization chamber by the electromagnet 34 in such a manner that it is not in contact with the other part of ionization chamber. The position, or height, of the charge collecting electrode 32 is detected by the optically operated position sensor having the light source 36 and the photo-sensor 38. The output signal of the position sensor is applied through the amplifier control circuit 40 to the electromagnet 34, so that the charge collecting electrode 32 is suspended substantially at the same position in a non-contact mode. A technique of utilizing magnetism to suspend or float an object in the air is well known in the art. The technique, as disclosed by the publication "Oyo Buturi" (The journal of the Japan Society of Applied Phisics) Vol. 58 (1989) pp. 212–224, is applied to balances, densitometers, viscometers, etc.

The magnetic substance 30 may be replaced by a permanent magnet. If, in this case, the force of attraction of the permanent magnet is weak when compared with the weight of the charge collecting electrode 32, the electromagnet 34 is used to attract the permanent magnet; and if, in contrast, the force of attraction of the permanent magnet is strong, the electromagnet 34 is used to repel the permanent magnet. If the force of attraction of the permanent magnet is substantially in balance with the weight of the charge collecting electrode 32, it is necessary to invert the polarity of the current flowing in the electromagnet 34, however, the consumption of electric power for floating the charge collecting electrode by magnetism is saved.

In the above-described embodiment, when radiations are applied to the ionization chamber after the potential of the charge collecting electrode 32 is reset to zero, then the potential of the charge collecting electrode 32 is changed by the ionization current. This potential change is detected by the non-contact electrometer 42.

In the embodiment, it is unnecessary to reset the potential of the charge collecting electrode 32 periodically. That is, by monitoring a potential change by the non-contact electrometer 43, the charge increment due to radiation or an abnormal amount of radioactivity in the air can be detected at all times.

Figure 2:
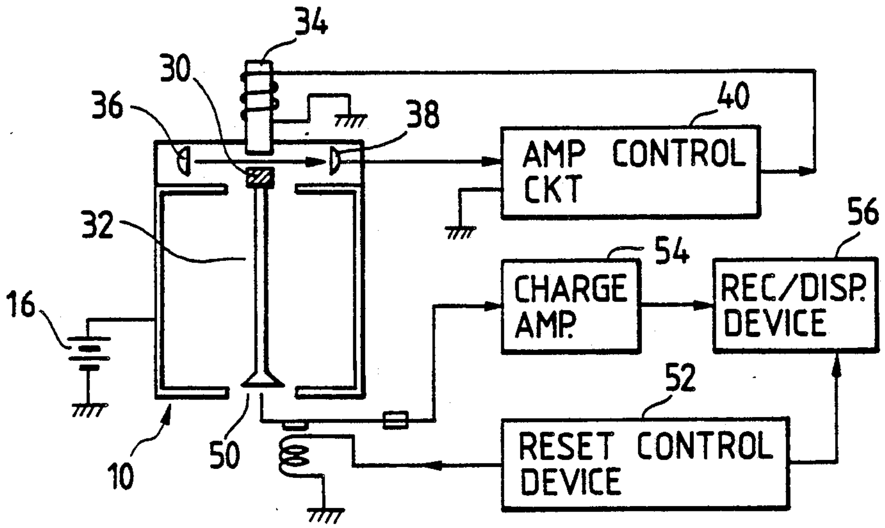
FIG. 2 is a block diagram, partly as a sectional diagram, showing the arrangement of a second embodiment of the invention.

A second embodiment of the invention will be described with reference to FIG. 2 in detail.

In the second embodiment, the ionization chamber 10 is similar to that of the first embodiment. A reset contact 50 is provided below a charge collecting electrode 32. The reset contact 50 is brought into contact with the charge collecting electrode 32 by a reset control device 52 every predetermined time so as to reset the potential of the charge collecting electrode 32, and the quantity of charge flowing through the reset contact 50 is measured with a charge (sensitive) amplifier 54. The quantity of charge thus measured is recorded and displayed by a record/display device 56.

As was described before, the ionization current induced by radiations in the natural circumference or radon in the air is of the order of $10^{-15}$ A. In this case, the quantity of charge flowing through the reset contact 50 with the potential of the charge collecting electrode reset every hour for instance corresponds to $3.6\times10^{-12}$ C (Coulomb), which can be detected with high accuracy.

The others are the same as those in the first embodiment described above.

Figure 3:
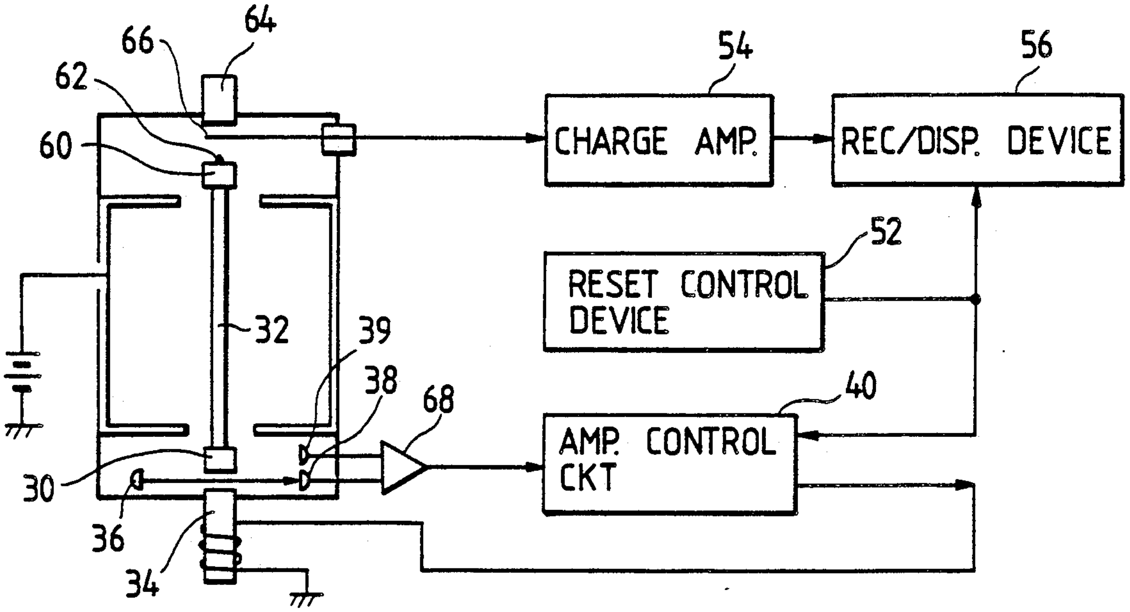
FIG. 3 is a block diagram, partly as a sectional diagram, showing the arrangement of a third embodiment of the invention.

A third embodiment of the invention will be described with reference to FIG. 3 in detail.

In the third embodiment, a magnet element 30 is connected to the lower end of a charge collecting electrode 32, which is the same as that in the second embodiment, and a permanent magnet 60 with a contact 62 is connected to the upper end of the electrode 32. The charge collecting electrode 32 is suspended by another permanent magnet 64. A position sensor consisting of a light source 36 and a photo-sensor 38, and an electromagnet 34 are provided below the charge collecting electrode 32. The force of attracting the electrode 32 downwardly is controlled by a feedback technique so that the electrode 32 is maintained suspended in such a manner that it is not in contact with the other part of the ionization chamber.

One of the permanent magnets 60 and 64 may be replaced by a magnetic substance.

A reset contact 66 is provided in such a manner as to confront with the contact 62 provided upper end of the charge collecting electrode 32. The reset contact 66 is connected to a charge amplifier 54 which is the same as that in the second embodiment.

A reference light detecting photo-sensor 39 (for instance a photo-diode) is provided beside the photo-sensor 38. The outputs of these photo-sensors 38 and 39 are applied to a differential amplifier 38, so that a DC component is removed from a position detection signal, whereby the influence of room light are eliminated.

A reset control device 52 applies a reset signal to an amplifier control circuit 40 every predetermined period of time, so as to cut or reduce the coil current of the electromagnet 34. As a result, the charge collecting electrode 32 is moved upwardly until the contact 62 is brought into contact with the reset contact 66.

The others are the same as those in the second embodiment described above.

In the third embodiment, the charge collecting electrode 32, being attracted from above and below, is kept steady, with the result that the measurement can be stably carried out. Furthermore, in the third embodiment, no particular resetting means is required; that is, the resetting operation can be achieved by utilization of the forces of attraction of the permanent magnets 60 and 64.

Figure 4:
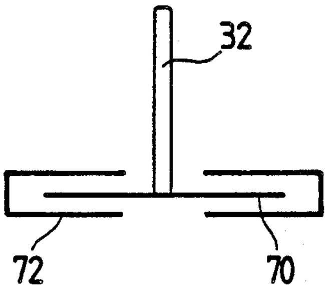
FIG. 4 is a sectional view showing the lower end portion of a charge collecting electrode and its relevant components in a fourth embodiment of the invention.
Figure 5:
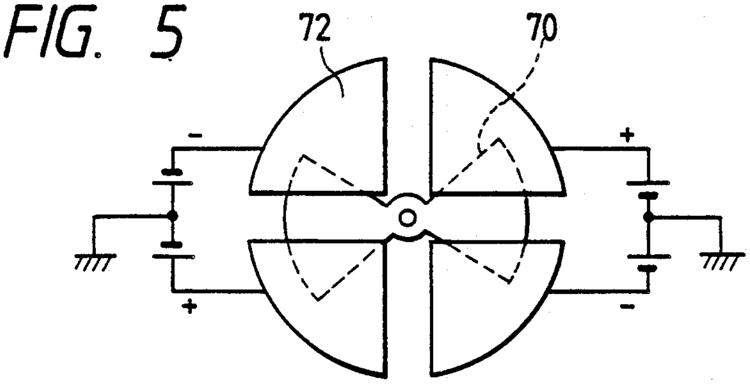
FIG. 5 is a plan view showing a blade connected to the charge collecting electrode and quadrant electrodes in the fourth embodiment of the invention.

A fourth embodiment of the invention will be described with reference to FIGS. 4 and 5 in detail. In the embodiment, charge measurement is carried out on an electrostatic attractive force.

In the fourth embodiment, an ionization chamber is substantially the same as that in the first embodiment. The ionization chamber contains a charge collecting electrode 32 which has blade 70 at the lower end as shown in FIG. 4. As shown in FIG. 5, four quadrant electrodes 72 are arranged in such a manner as to confront with the blade 70, and are applied with positive and negative voltages.

Upon incidence of radiations to the ionization chamber thus constructed, the quadrant electrodes 72 impart electrostatic attractive forces to the blade 70 of the charge collecting electrode 32, so that the blade 70 is held at the angle with which the electrostatic attractive forces are balanced. Therefore, by measuring the angle of the blade 70 by using light or the like in a non-contact mode, the potential of the charge collecting electrode 32 can be measured in a non-contact manner.

In the fourth embodiment, it is essential that the charge collecting electrode 32 suspended in the ionization chamber is rotated only by the electrostatic attractive forces of the quadrant electrodes 72. Hence, it is desirable that the charge collecting electrode 32 receive no rotational magnetic component, and its suspending part is completely axially symmetrical.

A potential measuring method using electrostatic attractive forces as in the above-described fourth embodiment is well known with respect to a quadrant electrometer, Lindeman (phonetic) electrometer, and Lauritsen electroscope.

Figure 6:
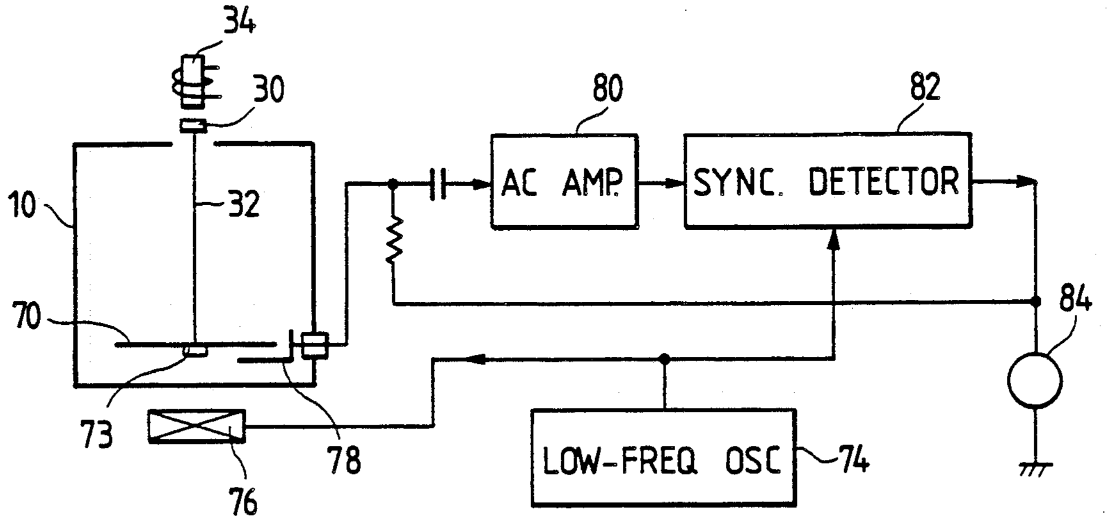
FIG. 6 is a block diagram, partly as a sectional diagram, showing the arrangement of a fifth embodiment of the invention.
Figure 7:
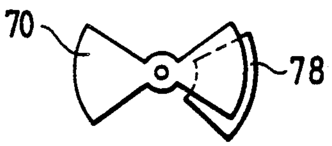
FIG. 7 is a plan view showing a blade and a detecting electrode in the fifth embodiment of the invention.
Figure 8:
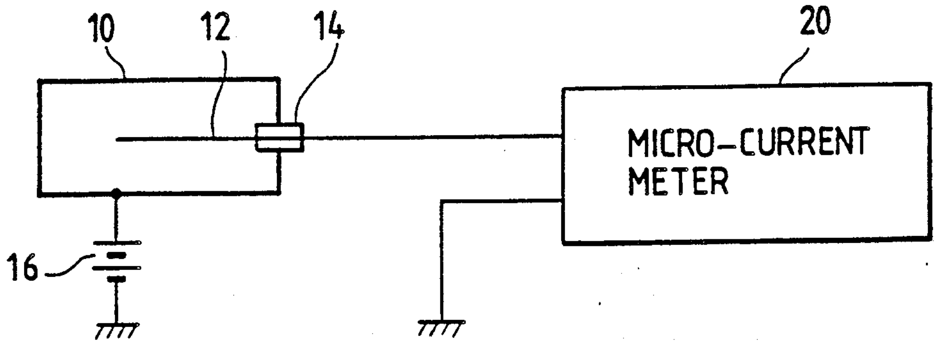
FIG. 8 PRIOR ART
FIGS. 8, 9 and 10 are block diagrams, partly as sectional diagrams, showing the arrangements of examples of a conventional ionization chamber.
Figure 9:
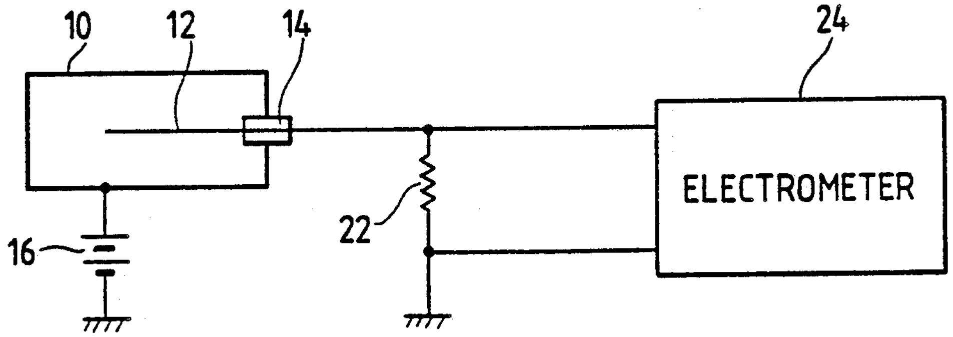
FIG. 9 PRIOR ART
Figure 10:
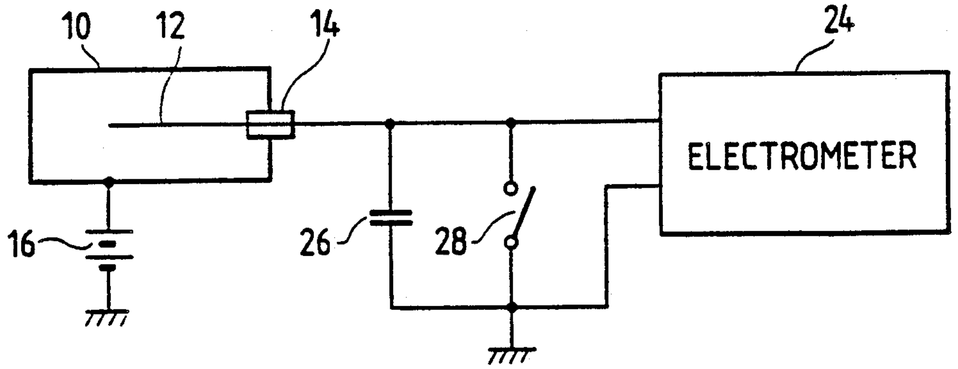
FIG. 10 PRIOR ART

A fifth embodiment of the invention will be described with reference to FIGS. 6 and 7 in detail. In the fifth embodiment, charge measurement is carried out by using a rotary electrometer.

In the fifth embodiment too, an ionization chamber which is substantially the same as that in the first embodiment is employed. As shown in FIG. 6, an electrically conductive blade 70 and a small permanent magnet 73 are secured to the lower end of a charge collecting electrode 32, and a rotating-magnetic-field coil 76 is disposed near the permanent magnet 73. A low frequency oscillator 74 causes the coil 76 to generate a rotating magnetic field. As shown in FIG. 7, a detecting electrode 78 is arranged in such a manner as to confront with the blade 70. An AC voltage developed in the detecting electrode 78 through electrostatic induction is detected with an AC amplifier 80, synchronous detector 82 and voltmeter 84.

In the fifth embodiment, a rotating magnetic field is externally applied by means of the rotating-magnetic-field coil 76, to rotate the charge collecting electrode 32. The AC voltage developed in the detecting electrode 78 through electrostatic induction which is confronted with the blade 70 of the charge collecting electrode 32 is amplified by the AC amplifier 80. The output of the amplifier 80 is applied to the synchronous detector 82, where it is subjected to synchronous detection with the rotating frequency to provide a DC voltage. The DC voltage thus formed is measured and indicated by the voltmeter 84.

The charge measuring method in the fifth embodiment is similar to that for a vibrating reed electrometer. In the method, the amplification degree is stabilized by negative feedback.

In the fifth embodiment, unlike the fourth embodiment, the rotating moment attributing to the asymmetry of the suspended part can be disregarded.

In the fifth embodiment, the charge collecting electrode 32 is rotated; however, it may be swung as the case may be. If the charge collecting electrode can be rotated or swung directly by using induction current in the blade caused by the rotating-magnetic-field coil 76 or the like, then permanent magnet 73 may be eliminated.

In the above-described embodiments, the position sensor is made up of the light source 36 and the photosensor 38; however, the invention is not limited thereto or thereby. For instance, an ultrasonic position sensor, or a sensor operated on the variation of capacitance or inductance may employed.

Furthermore in the above-described embodiments, the magnetic substance 30 is connected to the upper end of the charge collecting electrode 32; however, the invention is not limited thereto or thereby. For instance, the charge collecting electrode 32 may be a magnetic substance in its entirety.

The structure of the electromagnet 34 is not always limited to that which has been described; that is, for instance a three-coil type electromagnet may be employed.

In addition, the charge collecting electrode 32 is suspended in the ionization chamber 10 in such a manner that the former is not in contact with the latter; however, the invention is not limited thereto or thereby.

What is claimed is:

1. An ionization chamber comprising:
   - means to define an enclosure of said ionization chamber
   - an electrically conductive charge collecting electrode including one of a magnetic substance and a permanent magnet;
   - an electromagnet for positioning said charge collecting electrode in non-contact with enclosure defining means of said ionization chamber;
   - a position sensor for detecting the position of said charge collecting electrode;
   - a circuit for feedback-controlling the magnetic force of said electromagnet to maintain said charge collecting electrodes at the substantially same position; and
   - ionization current detecting means for detecting an ionization current collected at said charge collecting electrode by ionization due to radiation applied to said ionization chamber.

2. An ionization chamber as claimed in claim 1, wherein said ionization current detecting means is a non-contact type electrometer.

3. An ionization chamber as claimed in claim 2, wherein said one of the magnetic substance and the permanent magnet is provided at the upper end of said charge collecting electrode, said feedback controlling circuit controls a coil current of said electromagnet according to the output of said position sensor, and said electrometer has a detecting electrode which is confronted with an electrically conductive blade connected to the lower end of said charge collecting electrode.

4. An ionization chamber as claimed in claim 1, wherein said ionization current detecting means comprises:
   - a reset contact being brought into contact with said charge collecting electrode every predetermined period of time; and
   - means for detecting an amount of charge flowing through said reset contact at the time of resetting said charge collecting electrode.

5. An ionization chamber as claimed in claim 4, wherein said reset contact is operated by a reset control device.

6. An ionization chamber as claimed in claim 1, wherein said one of the magnetic substance and the permanent magnet is connected to the lower end of said charge collecting electrode, a first permanent magnet with a contact is connected to the upper end of said charge collecting electrode, and said permanent magnet is suspended by a second permanent magnet.

7. An ionization chamber as claimed in claim 6, wherein one of said first and second permanent magnets is replaced by a magnetic substance.

8. An ionization chamber as claimed in claim 1, wherein said ionization current detecting means comprises:
   - an electrically conductive blade connected to said charge collecting electrode;
   - electrode plates across which predetermined voltage is applied; and
   - means for detecting the displacement of said blade which is caused by electrostatic attractive forces provided between said blade and said electrode plates.

9. An ionization chamber as claimed in claim 1, wherein said ionization current detecting means comprises:
   - an electrically conductive blade connected to said charge collecting electrode;
   - variable magnetic field forming means for externally providing a variable magnetic field, which varies periodically, to turn said charge collecting electrode;
   - a detecting electrode confronted with said blade; and
   - means for detecting the charge appearing at said detecting electrode due to electrostatic induction.

* * * * *